Feb. 11, 1930.  S. BALLANTINE  1,747,045
METHOD OF AND MEANS FOR REDUCING RETROACTIVE
CURRENTS IN AUDION AMPLIFIERS
Filed July 14, 1925
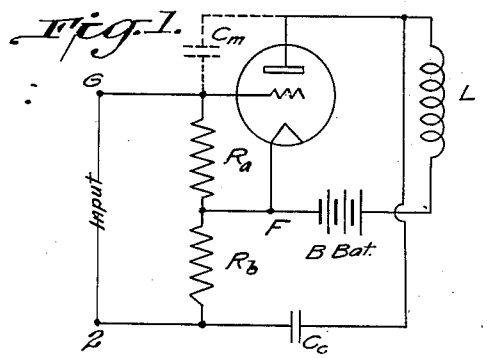
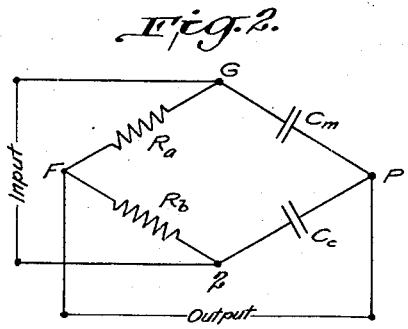
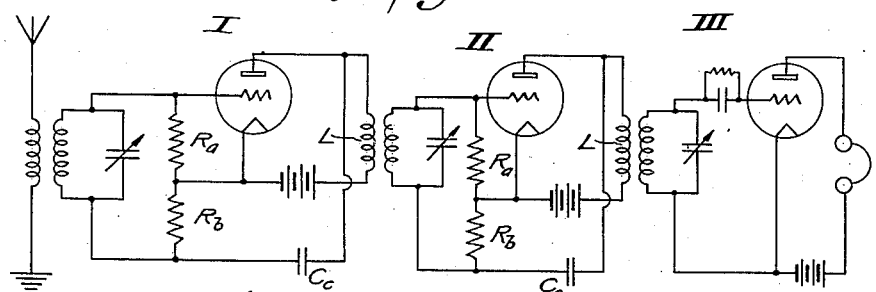
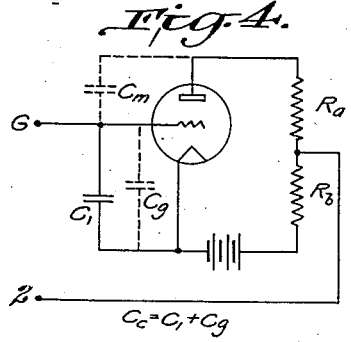
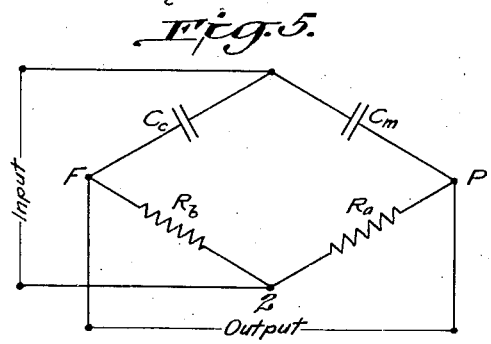
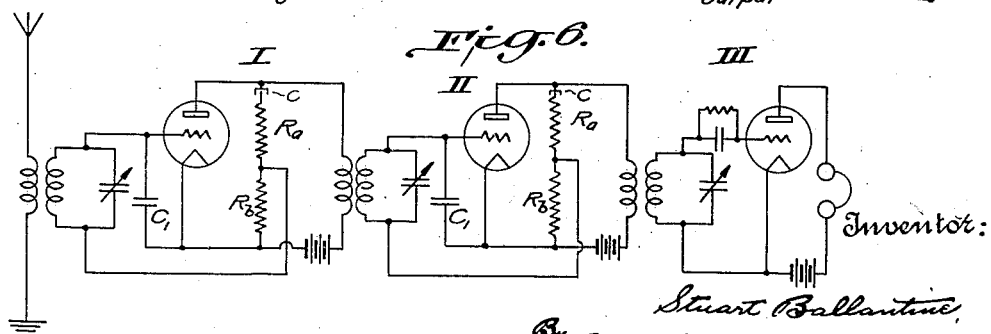
Inventor:
Stuart Ballantine,
By Byrne Townsend & Brickenstein,
Attorneys.

Patented Feb. 11, 1930

1,747,045

UNITED STATES PATENT OFFICE

STUART BALLANTINE, OF WHITE HAVEN, PENNSYLVANIA, ASSIGNOR TO RADIO FREQUENCY LABORATORIES, INCORPORATED, OF BOONTON, NEW JERSEY, A CORPORATION OF NEW JERSEY

METHOD OF AND MEANS FOR REDUCING RETROACTIVE CURRENTS IN AUDION AMPLIFIERS

Application filed July 14, 1925. Serial No. 43,636.

This application is a continuation in part of my application Ser. No. 629,702, filed April 3, 1923. My present invention relates to circuits for thermionic amplifiers, and particularly to a circuit and method for compensating such an amplifier, or a cascaded series of such amplifiers, for retroactive currents which flow through the grid-plate capacity of a thermionic tube. By this compensation, I diminish or completely eliminate the disturbing effects which commonly arise from the fact that variations in potential across the plate circuit impedance affect the input circuit terminals of an audion amplifier stage through the grid-plate capacity of the audion tube.

In carrying my invention into effect I arrange the impedance network of an amplifying stage to form an alternating current Wheatstone bridge circuit in which the input circuit of the amplifier stage (which may coincide with the output circuit of the tube) form conjugate arms of the bridge. In particular, I form a Wheatstone bridge circuit having two resistive arms and two capacitive arms, one of these capacitive arms being the grid-plate capacity of the tube. By partially or completely balancing this bridge I may diminish or completely eliminate the disturbing effects due to the retroactive currents which flow through the grid-plate capacity of the audion tube.

Referring now to the drawings, Fig. 1 shows an audion amplifier arranged according to my invention. Fig. 2 is a diagrammatic representation of the circuit of Fig. 1, the essential alternating current elements of the circuit being shown as a Wheatstone bridge. Fig. 3 is a cascaded audion amplifier, each stage of which is arranged according to my invention. Fig. 4 is a circuit diagram of another audion amplifier embodying my invention. Fig. 5 is a diagrammatic representation of the circuit of Fig. 4 as an alternating current bridge. Fig. 6 is a cascaded audion amplifier each stage of which is arranged according to my invention.

In Fig. 1, the capacity between the grid and plate of the tube is represented by the dotted lines at $C_m$. This capacity forms an arm of the bridge. The terminals of the input circuit are G and 2. Between the higher terminal G and the filament is connected the resistance $R_a$ which forms an arm of the bridge. Between the filament and the lower side of the input circuit is connected the resistance $R_b$ forming an arm of the bridge, and between the lower side of the input circuit and the plate is connected a capacity $C_c$ forming an arm of the bridge. The point 2 intermediate $R_b$ and $C_c$ serves as the lower terminal of the input circuit.

The capacity $C_c$ and resistance $R_b$ are shunted by a coil L in series with the B-battery. The purpose of this coil is to give a direct current path by which the B-battery potential may be impressed upon the plate. It may also serve as a means for coupling the output circuit of this stage to the next succeeding stage. Since the coil L, and the B-battery in series with it, are connected across a conjugate arm of the bridge and not across one of the balancing arms, they do not affect the balance of the bridge nor do they form a part of the alternating current bridge circuits. A suitable resistance might obviously be substituted for the coil.

As will be clear from Fig. 2, the points G, 2, P and F of the amplifier shown in Fig. 1 are interconnected by a bridge network in which the input circuit terminals of the stage and the output circuit of the amplifier form conjugate arms of the bridge. When the bridge is balanced the input and output circuits are electrically isolated and variations in potential across the impedance between P and F will not affect the input circuit terminals G and 2.

The condition for balance of the bridge may readily be seen from the diagram to be $$\frac{C_c}{C_m} = \frac{R_a}{R_b}.$$

Fig. 3 shows a cascaded amplifier in which I and II are amplifier stages each compensated according to my invention and working into a detector III. It is obvious that the particular way in which the stages are cascaded is immaterial and that any appropriate form of coupling element, for instance, a resistance, may be used between them, and that any of the well-known coupling methods may be employed.

In all the figures such usual circuit elements as B-battery by-pass condensers, filament batteries, and rheostats have been omitted for the sake of simplicity.

The resistance $R_a$ is shunted by the grid-filament capacity of the tube and the impedance of this arm of the bridge is therefore not strictly independent of frequency. However, such a parallel resistance-capacity circuit has marked advantages over previously suggested arrangements employing a parallel inductance-capacity circuit. The resistance may be so proportioned that the impedance variation with frequency is small and produces no substantial unbalance of the bridge over a considerable range, whereas if a parallel inductance-capacity circuit were to be employed the impedance variation with frequency would be so large as to produce harmful unbalance of the bridge. Moreover, a parallel resistance-capacity circuit is aperiodic and the bridge may be balanced for all frequencies, while any parallel inductance-capacity circuit necessarily has a natural frequency of oscillation at which it is impossible to balance the bridge.

If I wish, I may shunt the resistance $R_b$ by a capacity of such an order as to produce a variation in the impedance of $R_b$ corresponding in magnitude to the variation in the impedance of $R_a$ due to the grid-filament capacity. The balance of my bridge then becomes theoretically independent of frequency and practically so over a considerable range.

As absolute and frequency independent balance is neither an essential feature of my invention nor a practical limitation upon the construction of amplifiers, a satisfactory approximation to a perfect balance may be had with the circuit of Fig. 1 when the properties of the parallel resistance-capacity arm GF are such that it functions as a substantially resistive arm over a considerable range of frequencies. I am of course aware of the physical causes which may operate to prevent the resistive and capacitive arms from behaving as mathematical resistances and capacities, and it is to be understood that the term "resistive arm" is intended, unless otherwise qualified, to designate an arm or circuit having a reactance which is resistive in character but which need not be that of a pure resistance.

Another form of my invention is shown in Figs. 4, 5 and 6. Fig. 4, like Fig. 1, shows the impedance network of an amplifier stage arranged in the form of a Wheatstone bridge having two resistive and two capacitive arms, one of these capacitive arms being the grid-plate capacity of the tube. The second capacitive arm is a capacity between the grid and filament of the tube. This may be either the inherent internal capacity of the tube or this inherent capacity plus an external one connected in parallel therewith, their values thus being additive. In order to make the drawing as general as possible, I have represented the inherent grid-filament capacity of the tube by the dotted line at $C_g$, and have shown an external capacity $C_1$ in parallel therewith. The value of the capacity $C_1$ may or may not be zero. The sum of these capacities is what I term $C_c$, which is the total capacity between grid and filament, and which forms an arm of the Wheatstone bridge. The remaining arms of the bridge are formed by the resistances $R_a$ and $R_b$ which are connected in series in the plate circuit of the tube.

The lower terminal 2 of the input circuit is connected to an intermediate point in the plate circuit impedance, that is, between the resistances $R_a$ and $R_b$.

Although in Fig. 4 I have shown the B-battery direct current circuit as being through the resistances $R_a$ and $R_b$, this is not necessary to my invention. I may use a branch output circuit in which is a coil, as for instance a transformer primary, or other suitable coupling element, and I may wish to connect the B-battery in this branch of the circuit. Such a method of coupling is shown in Fig. 6. In this case an isolating condenser C may be inserted between $R_a$ and the plate in order to prevent a flow of battery current through $R_a$ and $R_b$ with consequent bias of the grid.

Fig. 5 is a conventional bridge diagram showing the essential alternating current elements of the circuit of Fig. 4. It will be seen from this diagram that the input circuit of the stage is connected across one conjugate arm of the bridge and the output circuit across the other conjugate arm. They are thus electrically isolated from one another. That is, potential variations across the impedance between points P and F will not affect the input circuit terminals G and 2. The condition for balance of this bridge is $$\frac{R_a}{R_b}=\frac{C_c}{C_m}$$

Fig. 6 shows a cascaded amplifier having two amplifier stages I and II each compensated according to my invention and working into a detector III. Any number of stages may be thus cascaded. My invention is not limited to a radio-frequency amplifier, and it may be especially applicable to an audio-frequency amplifier. Moreover, any form of coupling between stages may be used, as for instance resistance coupling, and the coupling coils shown in Fig. 6 may be replaced by other suitable coupling elements.

The bridge circuit shown in Figs. 4, 5 and 6 is theoretically independent of frequency, for the reason that the balancing arms are either pure resistance or pure capacity. In practice I obtain such close approximation to the theoretical results that a single adjustment produces compensation over a long range.

I claim:

1. An audion amplifier the impedance network of which is arranged in the form of an alternating current Wheatstone bridge having four balancing arms one of which is the grid-plate capacity of the audion tube, one of which is a capacity connected between the plate of said tube and one terminal of the input circuit, one of which is a resistive impedance connected between the cathode of said tube and said terminal of the input circuit, and one of which is a resistive impedance connected between the grid and cathode of said tube.

2. In combination, a three-electrode audion tube having an inherent grid-plate capacity, a resistance connected between the grid and cathode of said tube, a resistance and a capacity connected in series in the plate circuit of said tube, and an input circuit one terminal of which is connected to the grid of said tube and the other terminal of which is connected to an intermediate point in the plate circuit impedance of said tube.

3. The combination with a three-electrode thermionic device having anode, cathode and grid electrodes and an input circuit, a resistance connected between the grid and cathode of said thermionic device, a connection comprising a second resistance and a capacity connected in series between the cathode and anode of said thermionic device and an input element connected between the grid and the junction of said series connected resistance and capacity.

4. An electrical amplifier circuit comprising, in combination, a vacuum tube amplifying device, an output circuit for the amplifier stage, an input circuit for said stage, and impedance elements forming an alternating current Wheatstone bridge of which said output and input circuits form conjugate arms, one balancing arm of said bridge being constituted by capacity between anode and control electrode of said vacuum tube, another balancing arm adjacent said capacitive balancing arm being constituted by capacity, and the two remaining balancing arms being constituted by resistances.

5. An electrical amplifier circuit comprising, in combination, a vacuum tube amplifying device, an output circuit for the amplifier stage, an input circuit for said stage, and impedance elements forming an alternating current Wheatstone bridge of which said output and input circuits form conjugate arms, two balancing arms of said bridge respectively comprising capacity between anode and control electrode of said tube and a resistance between cathode and control electrode of said tube, and the two remaining balancing arms being constiuted by a resistance and a capacity connected in series between cathode and anode of said tube.

6. An audion amplifier stage wherein an audion and a plurality of impedances form an alternating current Wheatstone bridge network having as conjugate arms thereof the input circuit and the output circuit of said stage, characterized by the fact that the two bridge arms terminating at the plate terminal of the audion are capacitive, and the impedances of the two bridge arms terminating at the filament terminal of the audion are resistive.

7. An audion amplifier stage of the type wherein an audion and a plurality of impedance elements form an alternating current Wheatstone bridge network for opposing the effects of grid-plate capacity coupling between two circuits associated with the audion, characterized by the fact that said grid-plate capacity forms one balancing arm of the bridge, that a second balancing arm of the bridge is capacitive, and that the impedances of the two remaining balancing arms are resistive; the two said circuits being arranged as conjugate arms of the bridge.

In testimony whereof, I affix my signature.

STUART BALLANTINE.